United States Patent [19]
Scherzer et al.

[11] 3,894,940
[45] July 15, 1975

[54] HYDROCARBON CRACKING CATALYSTS WITH PROMOTER MIXTURES

[75] Inventors: Julius Scherzer; David Evan William Vaughan, both of Columbia; Edwin W. Albers, Annapolis, all of Md.

[73] Assignee: W. R. Grace & Co., New York, N.Y.

[22] Filed: Nov. 15, 1973

[21] Appl. No.: 416,128

[52] U.S. Cl............. 208/120; 208/111; 252/455 Z; 252/477 R
[51] Int. Cl......................... B01j 9/20; C01b 33/28
[58] Field of Search........................... 208/120, 111

[56] References Cited
UNITED STATES PATENTS

| | | |
|---|---|---|
| 3,668,264 | 6/1972 | Alley.................................. 260/671 |
| 3,764,520 | 10/1973 | Kimberlin et al................... 208/111 |
| 3,769,202 | 10/1973 | Plank et al.......................... 208/111 |
| 3,816,342 | 6/1974 | Plank et al....................... 252/455 Z |

*Primary Examiner*—Delbert E. Gantz
*Assistant Examiner*—G. E. Schmitkons
*Attorney, Agent, or Firm*—Joseph P. Nigon, Esq.

[57] ABSTRACT

A mixture of rare earth hydrogen Y type zeolite, and hydrogen ferrierite is used as a catalyst for the conversion of hydrocarbons. The rare earth hydrogen Y and a hydrogen ferrierite mixture may be advantageously combined with amorphous matrix components such as silica, alumina, silica-alumina hydrogel and/or clay to form cracking catalyst compositions of the fluid or moving bed type.

5 Claims, No Drawings

HYDROCARBON CRACKING CATALYSTS WITH PROMOTER MIXTURES

BACKGROUND OF THE INVENTION

For many years cation exchanged zeolites, particularly those of rare earth exchanged faujasites, such as those designated type X and type Y zeolites by the Linde division of Union Carbide Corporation have been found to be particularly useful in the conversion of petroleum feedstocks such as gas oil into lower molecular weight derivatives such as gasoline.

These prior art catalysts, while possessing a high degree of activity and the desired selectivity when compared to the previously available amorphous type hydrogel catalysts, were found to be relatively limited in terms of producing desirable products other than gasoline. A substantial effort has been made to alter the characteristics of the rare earth exchanged faujasites so as to produce product streams which are desirable end products such as olefins and/or gasolines high in aromatic content. However, it has frequently been found that when the faujasites are modified by exchange with additional metals other than rare earths the catalysts prepared tended to produce undesirable products such as dry gas and coke.

BRIEF DESCRIPTION OF THE INVENTION

We have developed a catalyst composition which comprises a mixture of a rare earth hydrogen type Y faujasite and a hydrogen exchanged ferrierite. More specifically we have found that an extremely active hydrocarbon conversion catalyst with superior coke selectivity may be obtained if the rare earth hydrogen Y zeolite is combined with about 5 to 40 percent by weight of a hydrogen ferrierite. For catalysts of equal activity the one containing a rare earth hydrogen Y/hydrogen ferrierite mixture provides an increase of about 25 percent in $C_4$ olefins over the corresponding yield obtained with a rare earth hydrogen Y promoted catalyst. The coke selectivity is also improved by about 45 percent.

DETAILED DESCRIPTION OF THE INVENTION

The high activity and gasoline selectivity of rare earth hydrogen Y promoted catalyst is well established. The catalytic activity of hydrogen-ferrierite which appears primarily responsible for the improved olefin selectivity is probably related to the structural characteristics of the zeolite. It has a three-dimensional pore system, containing 8- and 10-member rings which allow the diffusion of fairly large molecules into the pore system and thus to its active centers.

In a particularly preferred embodiment of the present invention the combination of rare earth hydrogen Y and hydrogen-ferrierite is combined with an inorganic oxide matrix such as silica, silica-alumina hydrogel and/or clay. Such compositions may readily be formed into microspheroidal products so as to provide the so called fluid cracking catalysts, or alternatively the compositions may be formed into relatively large sized beads to provide the moving bed type catalysts.

The rare earth hydrogen Y type zeolite used in the practice of this invention has been described previously. Briefly, the rare earth hydrogen Y zeolite comprises a type Y zeolite having a silica-alumina ratio of about 5 which has been rare earth exchanged in a particular manner to produce a zeolite which contains on the order of 6 to 14 weight percent rare earth ions measured as rare earth oxides, and less than 0.5 percent by weight alkali metal ions measured as alkali metal oxides. The rare earth hydrogen Y zeolite is prepared by first exchanging an alkali metal Y zeolite, usually sodium Y zeolite having a silica-alumina ratio on the order of 3 to 6 with a solution of rare earth ions at a pH of about 3.0 to 3.5 to reduce the alkali metal oxide content to a level of less than about 4 percent by weight. Subsequently, the exchanged zeolite is calcined at a temperature of 800° to 1400°F for a period of 1 to 3 hours. Finally the product is ammonium exchanged to further reduce the alkali metal content to less than about 0.5 percent by weight.

The final product contained 13.3 weight percent rare earth oxides, 0.2 weight percent $Na_2O$, and had a silica to alumina ratio of 4.8. The surface area after calcination at 1,000°C for 2 hours was 798 $m^2/g$.

The hydrogen exchanged ferrierite used in the practice of the present invention is obtained by acid treatment of a naturally occuring ferrierite. The ferrierite mineral was obtained from a deposit in Lovelock, Nevada. The rock had the following chemical composition: $SiO_2$—78.28%, $Al_2O_3$—11.72%, $Fe_2O_3$—0.78%, $CaO$—2.83%, $K_2O$—8.28%. The mineral is purified and converted to the hydrogen form by crushing, pulverizing and treating with an excess of 1 normal hydrochloric acid for a period of 3 hours at a temperature of 212°F. After this treatment the ferrierite was cooled to room temperature and washed chloride free. The acid treated product contained 81% $SiO_2$, 10.8 percent alumina and thus had a silica to alumina ratio of 12.7. The surface area after calcination at 1,000°F for 2 hours was 210 $m^2/g$.

To prepare the catalysts contemplated herein the rare earth hydrogen Y type zeolite is combined with the hydrogen ferrierite in ratios from 9 to 1 to 4 to 1 parts by weight. The precise ratio of exchanged type Y zeolite to exchanged hydrogen ferrierite will depend on the properties which are desired in the final catalyst composition. By adjusting the hydrogen ferrierite content of the catalysts, the percentage of $C_3$ and $C_4$ hydrocarbons recovered can be altered. If the coke selectivity is to be optimized, other ratios of hydrogen ferrierite and rare earth type Y hydrogen zeolite may be used.

When commercial catalysts are prepared using the unique combination of rare earth hydrogen Y zeolite, and hydrogen ferrierite contemplated herein, the zeolites are generally formed into catalysts particles which are microspheroidal, that is particles having a size in range of about 50 to 300 microns which are particularly useful in the fluid catalytic cracking of hydrocarbons. It is also contemplated that the present combination of zeolites may be formed into particles in the size range up to about ¼ inch which are particularly useful in the moving bed catalytic reaction of hydrocarbons.

The combination of zeolites may be formed into catalysts using a minimum or substantially no binders so as to provide a catalyst which comprises essentially 100 percent zeolite. Alternatively, 5 to 50 percent weight percent of the combination of zeolites may be combined with from about 50 to 95 percent by weight inorganic oxide matrix. Typical inorganic oxide matrixes include silica, alumina, and silica-alumina hydrogels. It is also contemplated that the matrix may comprise or contain clay such as kaolin and chemically or thermally modified kaolin.

The catalysts prepared by the process of the present invention are found to possess excellent stability for elevated temperatures and steam. Furthermore, it has been found that the activity and selectivity characteristics of the catalysts are exceptionally good for the production of gasoline and other valuable petroleum derivatives from cracking of gas oil boiling in the 400°–1,050°F range.

The cracking is carried out at a temperature of 800° to 1,050°F, a catalyst to oil ratio of 3–8 and a contact time of 0.5 seconds to 10 minutes.

The preferred operating conditions are a temperature of 800°–1,050°F, a catalyst to oil ratio of 3.0 to 6.0.

EXAMPLE I

A sample of rare earth hydrogen Y was prepared as follows: a total of 1,280 ml. of commercial rare earth chloride solution, containing 60 wt. % $RECl_3 \cdot 6H_2O$, was diluted with 6,400 ml. of deionized (D.I.) water to form component A. The sodium Y zeolite component was prepared separately by blending 3,200 g. (dry basis) of sodium zeolite Y into 9,760 ml. of D.I. water to form component B. The two components are mixed together and the pH of the resulting slurry was adjusted to 3.5 with HCl. The acidified slurry was heated for 45 minutes at 90°C, then filtered and washed with 8,000 ml. of water acidified with 160 ml. of 5 N HCl. The filter cake was then washed chloride free with D.I. water, dried at 105°C for 2 hours, and calcined at 540°C for 2 hours in a muffle furnace. The calcined material, which contained about 5% $Na_2O$, was ammonium exchanged with 10 percent ammonium sulfate solution, until the sodium level had been reduced to about 0.2 percent. The material was washed sulfate free with D.I. water and dried at 105°C. The product contained 13.3% $RE_2O_3$, and 0.2% $Na_2O$ (dry basis). The silica-alumina ratio was 4.8 and the surface area was 798 m²/g.

EXAMPLE II

A sample of hydrogen ferrierite was prepared as follows: hydrogen ferrierite was obtained as the naturally occuring material from a deposit in Lovelock, Nevada. The rock as mined had the following composition: 78.28% $SiO_2$, 11.72% $Al_2O_3$, 0.78% $Fe_2O_3$, 2.83% CaO, 8.28% $K_2O$.

A total of 10 g. of this mineral was crushed and pulverized. The pulverized ore was treated with a total of 100 ml. of 1 normal HCl by mixing the HCl with the ore and heating to a temperature of 212°F for a period of 3 hours. The resulting material was washed chloride free with DI water and dried at 105°C. The product contained 81% $SiO_2$, 10.8% $Al_2O_3$ (silica to alumina ratio 12.7). The surface area after heating to 1,000°C for a period of 2 hours was 210 m²/g.

EXAMPLE III

This example sets out the data collected in the microactivity test for the rare earth hydrogen Y-hydrogen ferrierite promoted catalysts and compares these results with results obtained when the individual components were used.

The promoter mixtures were prepared by blending the two components in different ratios. Promoter mixtures with a component ratio of rare earth hydrogen Y to hydrogen ferrierite of 9 to 1 and 4 to 1 by weight were prepared. The catalysts were tested in the microactivity unit by blending 10 weight percent of the promoter mixture with 90 weight percent of a semi-synthetic matrix. The semi-synthetic matrix contained 60% amorphous silica-alumina hydrogel and 40 percent kaolin clay. The amorphous silica-alumina hydrogel contained 75 weight percent silica and 25 weight percent alumina. The prepared catalyst was pilled and treated with steam at 1,350°F and 15 psig for a period of 8 hours.

The microactivity data was obtained using a reaction temperature of 900°F, a 16 weight hourly space velocity (WHSV) and West Texas Devonian gas oil feedstock (500° to 800°F cut). Comparison samples were prepared to contain only the rare earth hydrogen Y and the hydrogen ferrierite material, each sample having 10 weight percent promoter. The data collected is set out in Table I below.

Table I

| | Micro-Activity Data for RE-H-Y/H-ferrierite Promoted Catalysts | | | |
|---|---|---|---|---|
| Sample type<br>Sample No. | RE-H-Y/<br>H-ferrierite<br>1 | RE-H-Y/<br>H-ferrierite<br>2 | RE-H-Y<br>3 | H-ferrier<br>4 |
| RE-H-Y/H-ferr. wt. ratio | 9:1 | 4:1 | — | — |
| Conv., V% | 70 | 71 | 69 | 24 |
| $H_2$, W% | 0.03 | 0.04 | 0.05 | 0.05 |
| $C_3^=$, V% | 6.4 | 8.3 | 6.5 | 3.3 |
| $C_3$ tot., V% | 8.1 | 9.8 | 7.7 | 3.5 |
| $C_4^=$, V% | 3.0 | 5.1 | 4.4 | 4.2 |
| $i-C_4$, V% | 7.5 | 8.4 | 7.1 | 2.0 |
| $C_4$ tot., V% | 11.8 | 14.6 | 12.7 | 6.6 |
| $C_5^+$ gaso., V% | 57.6 | 56.7 | 56.8 | 18.2 |
| $C_4^+$ gaso., V% | 69.4 | 71.3 | 69.5 | 24.8 |
| C on Cat., W% | 0.36 | 0.3 | 0.4 | 0.1 |
| C on feed, W% | 2.1 | 1.8 | 2.4 | 0.6 |
| $C_5^+$ gaso./Conv., V/V | 0.84 | 0.80 | 0.82 | 0.77 |
| $C_5^+$ gaso./Coke, V/W | 27.3 | 31.0 | 23.5 | 30.2 |
| Conv./Coke, V/W | 32.7 | 38.7 | 28.7 | 39.5 |

From these data it is seen that the catalysts of the present invention are particularly active not only for the production of gasoline, but also for the production of $C_3$ and $C_4$ hydrocarbons. Furthermore, it is noted that our present catalysts have a very good coke selectivity.

EXAMPLE IV

This example compares the data obtained in a pilot plant unit with a conventional rare earth hydrogen Y promoted silica-alumina catalyst.

The rare earth hydrogen Y-H-ferrierite blend was prepared in a semi-synthetic base. The blend contained 62 weight percent amorphous silica-alumina and 28 weight percent kaolin clay. The amorphous catalyst contained 75 weight percent silica and 25 weight percent alumina. The blend was prepared by adding 10 weight percent of the rare earth hydrogen Y-H-ferrierite blend to matrix using the technique described in example 3 above. The catalyst was compared with a catalyst containing 6 percent rare earth hydrogen Y sieve in a silica-alumina catalyst containing 25 weight percent alumina and 75 weight percent silica. The pilot unit data was collected by operating the unit at 920°F at 20 WHSV using a West Texas gas oil feed. The data collected is set out in Table II below.

Table II

| Sample Type | 10 wt. % blend of RE-H-Y/H-ferrierite (4:1 ratio) | 6 wt. % blend of RE-H-Y |
|---|---|---|
| $RE_2O_3$: W% | 1.44 | 0.65 |
| Thermal analyses | | |
| 3 hrs. at 1000°F | | |
| SA (m²/g) | 259 | 294 |
| $N_2$PV(cc/g) | 0.43 | 0.54 |
| Pk.Ht. (mm/BK) | 48 | 37 |
| 3 hrs. at 1650°F | | |
| SA (m²/g) | 188 | 182 |
| $N_2$PV(cc/g) | 0.32 | 0.35 |
| Pk.Ht. (mm/BK) | 31 | 23 |
| Hydrothermal Analyses | | |
| S-20 Steam | | |
| SA (m²/g) | 131 | 144 |
| $N_2$PV(cc/g) | 0.27 | 0.35 |
| Pk.Ht.(mm/BK) | 29 | 21 |
| M-A (V% Conv) | 56.0 | 52.5 |
| Pilot Unit Data: 920°F, 4 C/O, 20 WHSV, WTGO feed | | |
| Conversion, V% | 68.0 | 66.5 |
| $H_2$, W% | 0.046 | 0.048 |
| $C_1 + C_2$, W% | 1.25 | 1.12 |
| Total $C_3$, V% | 8.0 | 8.3 |
| $C_3^=$, V% | 6.7 | 6.4 |
| Total $C_4$ | 11.2 | 9.3 |
| $C_4^=$, V% | 5.0 | 4.0 |
| $iC_4$, V% | 4.8 | 4.5 |
| $C_5^+$ gaso., V% | 60.0 | 57.0 |
| Gaso./Conv., V/V | 0.88 | 0.86 |
| RON + O | 88.6 | 88.8 |
| RON + 3 | 96.8 | 96.5 |
| MON + 0 | 77.0 | 77.2 |
| MON + 3 | 84.7 | 84.6 |
| Aniline Pt. °F | 87 | 89 |
| Br. Number | 60 | 57 |
| Coke, W% FF | 2.5 | 4.5 |

It is obvious from these data that the use of rare earth hydrogen Y-H-ferrierite blend improves overall conversion of the catalysts and increases especially the $C_4$ olefin yield. In addition the catalyst prepares substantially less coke than the conventional rare earth hydrogen Y catalyst.

What is claimed is:

1. A process for converting hydrocarbons to a product containing a high percentage of gasoline which comprises contacting a gas oil feedstock under hydrocarbon cracking conditions with a catalyst comprising a rare earth hydrogen exchanged faujasite having a silica to alumina ratio of 3.0 to 6.0 and a hydrogen ferrierite in a ratio of 10 to 1 to 1 to 1 and recovering the products formed thereby.

2. The process according to claim 1 wherein the rare earth hydrogen exchanged faujasite and hydrogen ferrierite are combined in an inorganic oxide matrix selected from the group consisting of silica, alumina, clay and mixtures thereof.

3. The process according to claim 2 wherein said matrix is present in amounts ranging from 5 to 95 weight percent.

4. The process according to claim 1 wherein the gas oil feedstock boils in the range of 400°–1,050°F.

5. The process according to claim 1 wherein the feedstock is cracked at a temperature in the range of 800°–1,050°F, with a contact time of 0.5 seconds to 10 minutes and a catalyst to oil ratio of 3 to 8.

* * * * *